H. B. STONE.
TELEPHONE SYSTEM.
APPLICATION FILED APR. 16, 1909.

940,746.

Patented Nov. 23, 1909.
5 SHEETS—SHEET 1.

WITNESSES:
Patrick J. Conroy
E. B. Tomlinson

INVENTOR:
Henry B. Stone
by Borrowe & Woodworth
attys.

H. B. STONE.
TELEPHONE SYSTEM.
APPLICATION FILED APR. 16, 1909.

940,746.

Patented Nov. 23, 1909.
5 SHEETS—SHEET 3.

WITNESSES:
Patrick J. Conroy
E. B. Tomlinson.

INVENTOR:
Henry B. Stone
by Browne & Woodworth
attys.

H. B. STONE.
TELEPHONE SYSTEM.
APPLICATION FILED APR. 16, 1909.

940,746.

Patented Nov. 23, 1909.
5 SHEETS—SHEET 5.

WITNESSES:
Patrick J Conroy
E. B. Tomlinson

INVENTOR:
Henry B. Stone
by Browne & Woodworth
Attys.

UNITED STATES PATENT OFFICE.

HENRY B. STONE, OF PROVIDENCE, RHODE ISLAND.

TELEPHONE SYSTEM.

940,746.

Specification of Letters Patent.

Patented Nov. 23, 1909.

Application filed April 16, 1909. Serial No. 490,276.

*To all whom it may concern:*

Be it known that I, HENRY B. STONE, a citizen of the United States, and a resident of Providence, in the county of Providence and State of Rhode Island, have invented a new and useful Improvement in Telephone Systems, of which the following is a specification.

My invention relates to telephony and its object is to provide a telephone system wherein the receiver at a station will be unaffected by the operation of a transmitter at the same station.

In carrying out my invention I employ a receiving circuit which includes an electro-responsive device, such as a telephone receiver of an ordinary sub-station set or a receiver of a repeating set or an oscillation detector of a wireless telephone set, and one of the windings of a transformer, the windings of which are conductively connected; a transmitting circuit associated with said receiving circuit and including the other winding of said transformer; and a transmitter associated directly or indirectly with said transmitting circuit and arranged to vary a suitable source of energy in accordance with the sound waves accompanying articulate speech; and I may employ suitable means for regulating the inductive effect between the windings of said transformer. The main line in the case of wire telephony or the antenna in the case of wireless telephony may be associated directly or indirectly with said receiving circuit. The arrangement of circuits above briefly described may be employed in telephony in a number of ways some of which are hereinafter set forth and all of which depend upon the fact that the receiver or other electro-responsive device is rendered immune from disturbance by local transmitting currents.

My invention will be explained in connection with the drawings which accompany and form a part of this specification and which show in diagram various circuit arrangements whereby the above mentioned object may be carried into effect.

Figure 6:
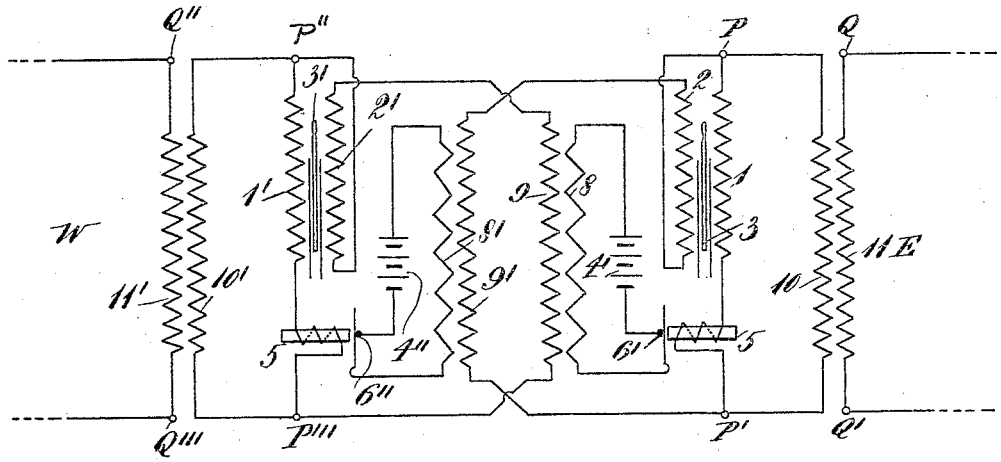
Figure 7:
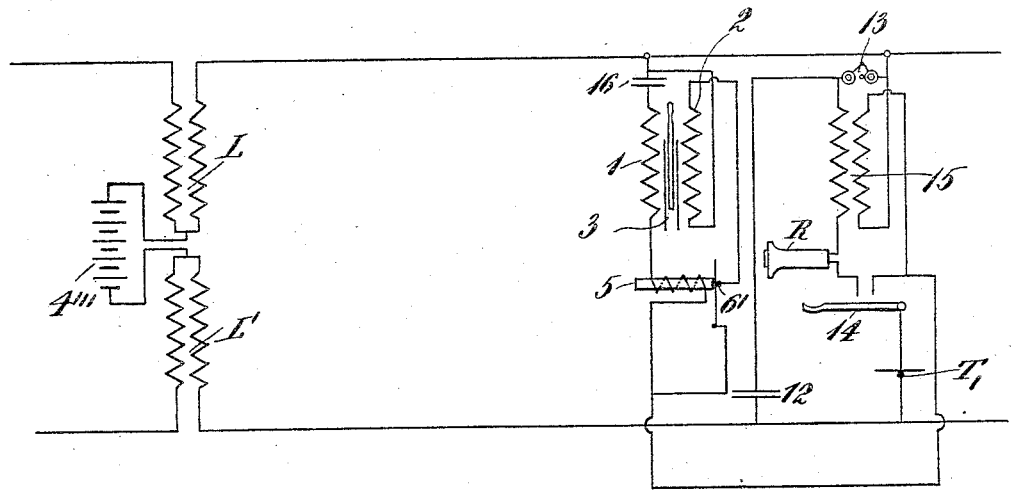
Figure 8:
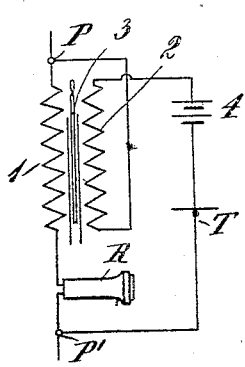
Figure 9:
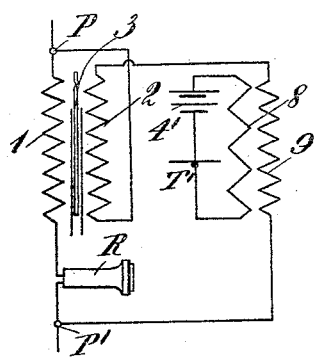
Figure 10:
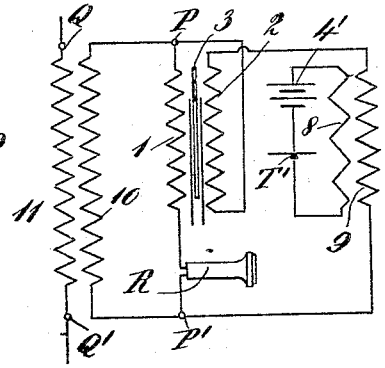
Figure 11:
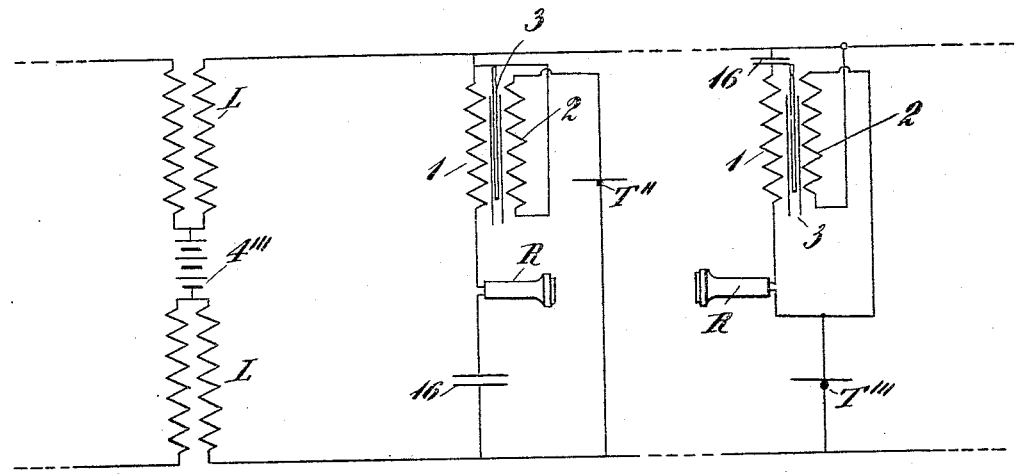
Figure 12:
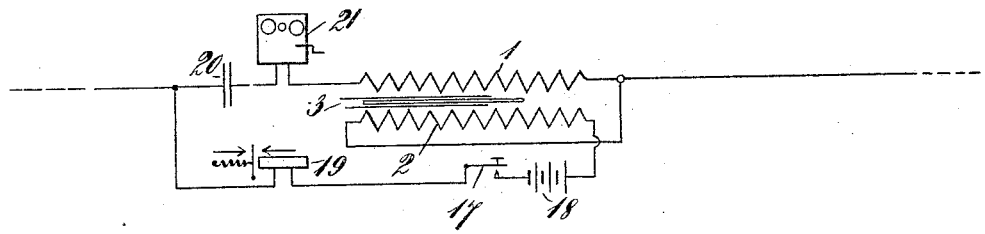
Figure 13:
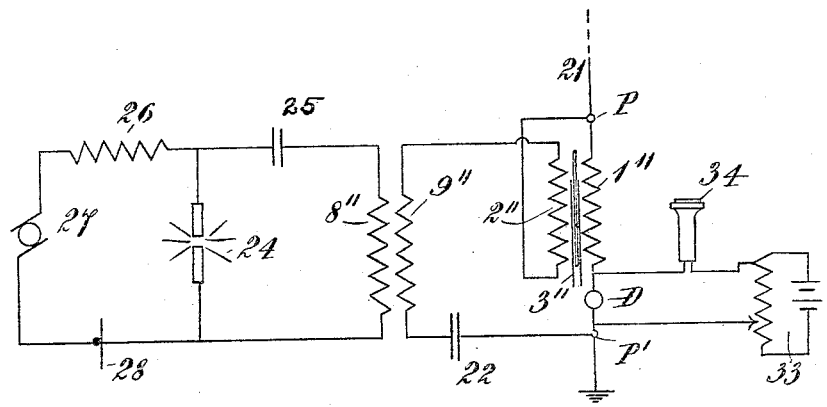
Figure 14:
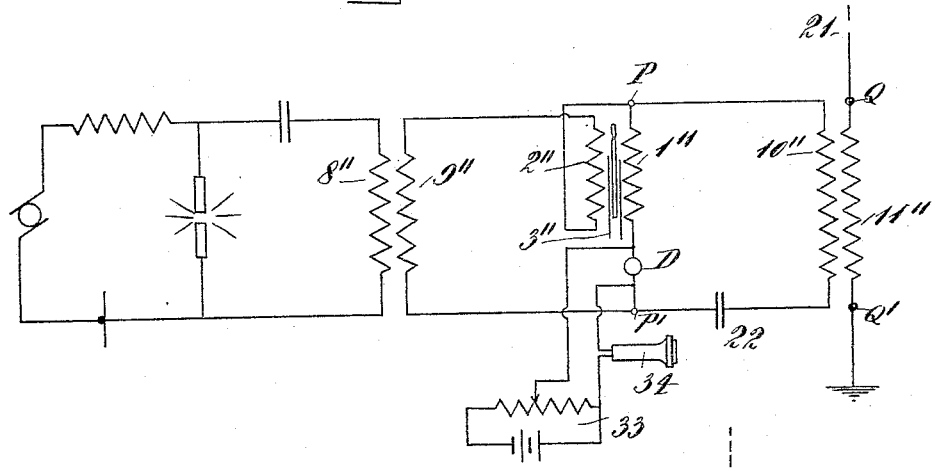
Figure 15:
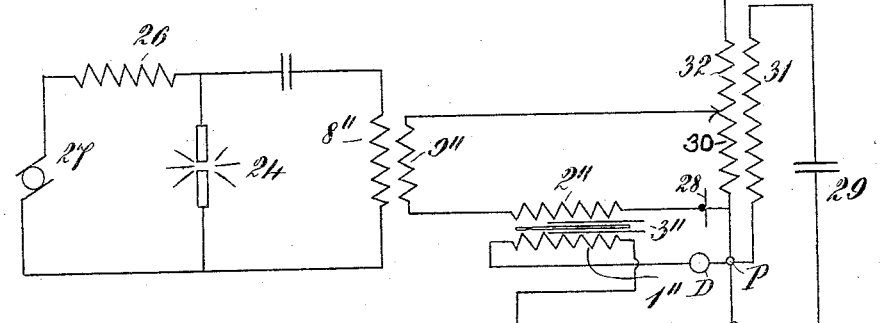
Figure 16:
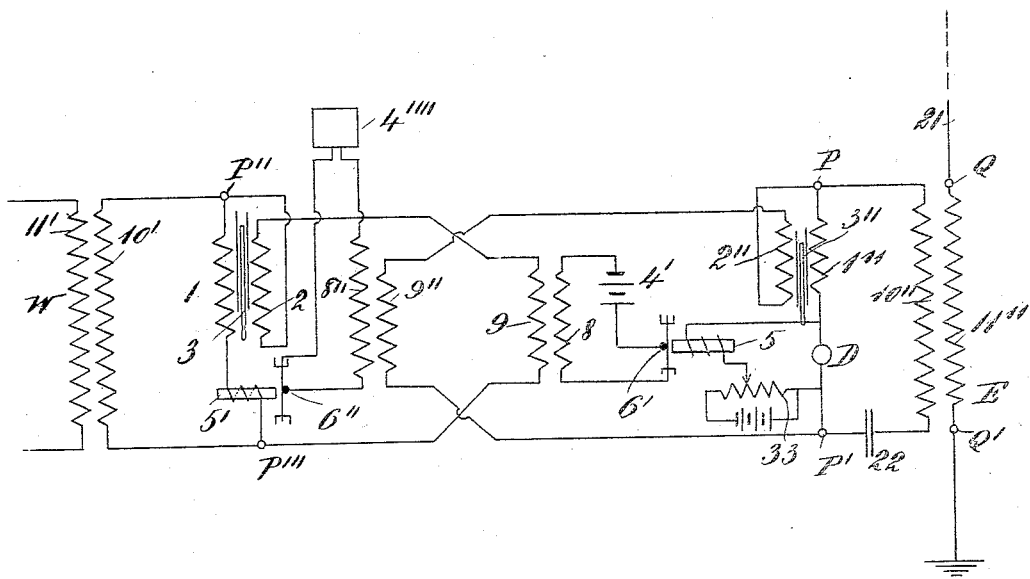
Figure 17:
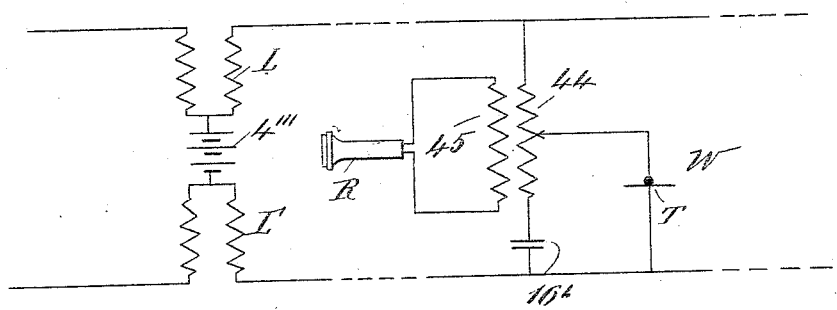

In the drawings—Figures 1 to 7 inclusive show telephone repeater systems embodying my invention. Figs. 8 to 10 inclusive show local-battery anti-side-tone systems embodying my invention. Fig. 12 shows the application of my invention to a composite signaling system. Figs. 13 to 15 inclusive show the application of my invention to an anti-side-tone wireless telephone system. Fig. 16 shows a wire-wireless telephone repeater system embodying my invention. Figs. 11 and 17 show the application of my invention to a common-battery anti-side-tone system.

Figure 1:
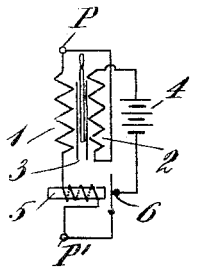

Figs. 1 and 8 have been introduced to show the simplest forms of my invention. The more practical forms thereof are illustrated in the other figures.

Figure 2:
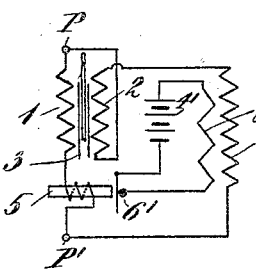

In Figs. 1 and 8, 1, 2 are the windings of a transformer which are conductively connected at the point P which may be a binding post. In Fig. 1 the receiving circuit comprises the winding 1 and the repeater-receiver 5, and the transmitting circuit includes the other winding 2, the battery 4 and the repeater-transmitter 6. In Fig. 8 the receiving circuit includes the winding 1 and the receiver R, and the transmitting circuit includes the winding 2, the battery 4 and the transmitter T. In Fig. 1, which represents a wire telephone repeater system, the transmitter 6 is actuated by the receiver 5. In Fig. 8 which represents a local-battery anti-side-tone system, the transmitter T is operated in the usual way by the subscriber and is of course independent of the receiver R.

The windings 1, 2 are shown in the present instance as wound in the same direction, although it will be understood that it is necessary only that they should be arranged to produce opposite magnetic effects. A number of means may be employed for regulating the inductive effect between the windings 1, 2, such as means for varying the number of turns of one of the coils or for varying their relative position, a variable resistance connected in shunt around one winding, a non-magnetic conducting tube inserted between the windings and the core on which they are wound, etc., all of which are well known in the art and require no further description herein. I prefer however to employ the core 3 which is adjustable with respect to said windings for the purpose of varying or regulating the inductive effect between the same, when the said windings are used in wire telephone systems. When my invention is applied to wireless telephony the core shown at 3″ in Figs. 13 to 16 inclusive may be made by embedding finely comminuted iron in a dielectric matrix such as mixture of beeswax and rosin in the manner well known in the art of wireless telegraphy, or preferably the windings are arranged to be relatively movable.

The circuit arrangements shown in Figs. 1 and 8 may be connected with the main line by means of the binding posts P P'.

The operation of the systems shown in Figs. 1 and 8, which is substantially the same as that of the systems illustrated in the other figures, is as follows: In the case of Fig. 1 the incoming current impressed upon the system at the points P P' energizes the repeater-receiver 5 which in turn actuates the repeater-transmitter 6 and causes pulsations of current from the battery 4 to pass out over the line, these pulsations being of much larger amplitude than those of the incoming current which initiate the action of the repeater-receiver. By suitable adjustment of the inductive effect between the windings 1, 2, as by the adjustment of the core 3, the effect of the variable component of the current from the battery 4 on the repeater-receiver is counteracted, the magnetic effect of such variable component in the winding 2 counteracting or neutralizing in whole or in part the effect thereof in the winding 1, and thereby the repeater system is prevented from continuous operation commonly known as "singing."

The operation of the system shown in Fig. 8 is the same as that above described in connection with Fig. 1 with the exception that the pulsations of battery current are created by the operator speaking into the transmitter T. By the counteraction of the variable component of these battery pulsations on the receiver R, the latter remains quiet while the operator is speaking,—in other words, the "side-tone" usually created in a receiver by speaking into the transmitter associated therewith is eliminated.

It will be obvious that the arrangement of the windings 1, 2 is such that their inductive effect will not prevent the incoming currents from acting upon the receiver R or upon the repeater-receiver 5 inasmuch as that portion of said currents which passes into the transmitter circuit and through the winding 2 develops in the winding 1 currents flowing through said winding 1 in the same direction as the incoming currents; and that said arrangement is such as to counteract the variations of potential impressed upon the point P by the locally-developed transmitting currents.

Inasmuch as the variable component only of the current in the transmitting circuit causes "singing" in a repeater system or "side-tones" in an ordinary set, the steady flow of current in said circuit through the receiving circuit may be prevented in any suitable manner as by including a condenser in series with said receiving circuit or by connecting the transmitter and battery in a circuit separate from the transmitting circuit and inductively related thereto. Examples of such use of a condenser are shown in Figs. 7, 11 and 12, and the inductive association of the transmitter and battery with the transmitting circuit is shown in Figs. 2 to 6 inclusive and in Figs. 9 and 10.

In Fig. 2 the transmitter 6' is included in series with the battery 4' and the winding 8 of a repeating coil, the other winding 9 of which forms part of the transmitting circuit and is connected in series with the winding 2. In Fig. 9 the transmitter T' is connected in series with the battery 4' and the winding 8 and the latter is inductively related with the winding 9 of the transmitting circuit.

Figure 3:
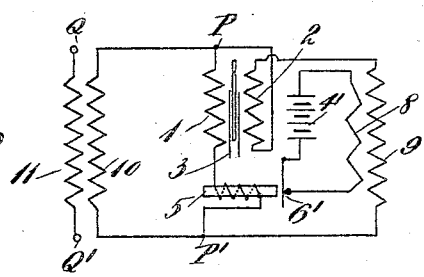

The preferred arrangement is shown in Figs. 3 and 10 in which the transmitting and receiving circuits, which are connected to the binding posts P P' are not connected directly with the main line but are inductively associated therewith through the intermediary of the transformer, the windings of which are shown at 10, 11, the former being connected to the binding posts P P' and the latter to the binding posts Q Q' to which the main line may be connected. The advantage of the systems shown in Figs. 3 and 10 over those hereinbefore described is that the winding 10 provides a continuously closed circuit for the apparatus connected to the binding posts P P' and thereby renders the same less sensitive to changes in external conditions.

Figure 4:
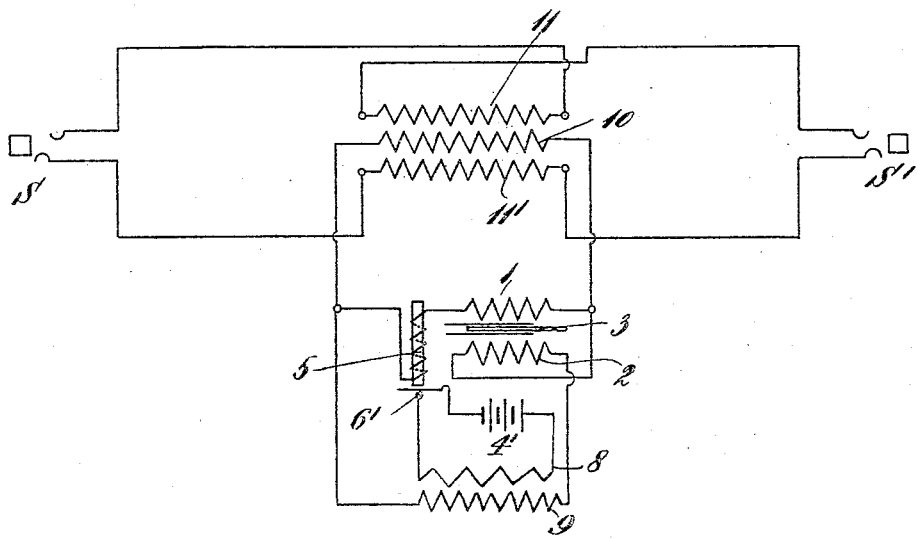

One way in which the system shown in Fig. 3 may be connected with the main line is shown in Fig. 4 in which S S' represent terminal stations and 11' a winding similar to the winding 11. The winding 10 is inductively related to the windings 11 11' which are connected serially with the two sides of the main line respectively and serve to maintain the balance of the latter. When the repeater system is serially connected with the main line through the transformer or repeating coil 10, 11, 11', the variations of current developed in the line by the operation of the distant transmitter will be intensified.

Figure 5:
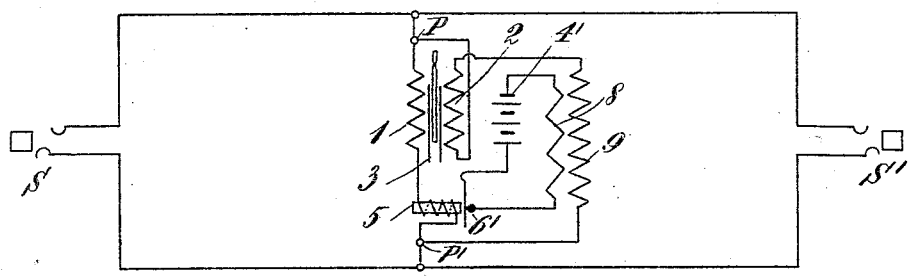

Another way in which the apparatus above described may be connected with the main line is shown in Fig. 5 in which the system illustrated in Fig. 2 is bridged across said main line at a point between the stations S S'. When the repeater system is bridged across the main line or connected in shunt therewith as shown in Fig. 5, the variations in potential between the points P P' produced by the operation of the distant transmitter will be intensified.

A third method of applying my invention is shown in Fig. 6 in which E, W represent all-metallic normally-closed main lines including the windings 11, 11', respectively, each of which is inductively related with one of the coils 10, 10' connected with the repeater system. When a repeater system is connected in series or in shunt with a main line in the manner shown in Figs. 4 and 5, a certain portion of the energy of the line passes from one section to the other without assisting in the operation of the repeater-receiver. However when the two repeater systems are connected in the manner shown in Fig. 6, the two sections E, W will work reciprocally and none of the energy of one can pass to the other without imparting energy to one of the repeater-receivers. In the system shown in Fig. 6, as in those above described, the differential transformer 1, 2 protects the repeater-receiver 5 from the effect of pulsations from the battery 4″ and the transformer 1′, 2′ protects the repeater-receiver 5′ from the effect of pulsations from the battery 4′.

Fig. 7 shows the application of my invention to a repeater system located at the subscriber's sub-station in a common-battery system having a central source of energy 4‴ and repeating coils L L′. The subscriber's set is shown in the present instance as comprising the condenser 12, bell 13, hook-switch 14, repeating coil 15, and transmitter $T_1$. 16 represents a condenser, the function of which has already been described. The system shown in Fig. 7 is designed especially for long-distance transmission and its operation is as follows: When the hook-switch is raised, incoming currents will energize the repeater-receiver 5 thereby actuating the repeater-transmitter 6′ and creating pulsations in the current of the battery 4‴ which in turn actuate the local receiver R. Current pulsations of the said source 4‴ initiacted by speaking into the transmitter $T_1$ energize the repeater-receiver 5 thereby actuating the repeater-transmitter 6′ and causing impulses of the central source of energy to be impressed upon the main line and actuate the receiver at the distant station. The incoming current pulsations even although too weak to operate effectively the local receiver R, will actuate the repeater-receiver 5 sufficiently to cause the repeater-transmitter 6′ to develop pulsations in the current of the local source which are of sufficient amplitude to operate the local receiver R. The repeater-receiver 5 is rendered independent of such reinforced pulsations produced by the operation of the repeater-transmitter 6′ by means of the transformer 1, 2 and its adjustable core 3.

In Fig. 11 I have shown two ways in which my invention may be applied to a common-battery system for preventing side-tones. The condenser 16 prevents the steady flow of current through the receiver R in both cases. The transmitter T″ which is connected in series with the winding 2 and to one side of the main line creates pulsations of the common battery current, the effect of which on the receiver R is neutralized by the windings 1, 2 as above explained. The transmitter T‴ which is connected in series with both windings 1, 2 and to one side of the line creates pulsations of common-battery current, the effect of which on the receiver R is neutralized by said windings.

Another way of preventing side tones in a common-battery system is shown in Fig. 17 wherein the receiver R is bridged across the line through the intermediary of the transformer 44, 45 and the transmitter $T^{iv}$ is connected between one side of the line and a point between the terminals of the winding 44. The pulsations produced by the transmitter in the current of the central battery 4‴ flow through the winding 44 in opposite directions and their effect upon the winding 45 and the receiver R is therefore neutralized. The condenser 16′ may be employed as shown to exclude the steady flow of current from the winding 44.

In Fig. 12, which represents a portion of a composite signaling system, 17 is a telegraph key, 18 the source of telegraph current, and 19 a relay, all connected in series with the winding 2 and with the main line. 20 is a condenser and 21 represents a complete telephone set including a transmitter, a receiver and a source of energy. The condenser and telephone set are connected in series with the winding 1 and with the main line. In composite signaling systems as usually constructed, the telephone ringing-current tends to actuate the telegraph relay and the telegraph signaling-current tends to operate the telephone receiver. A condenser usually is employed to exclude the telegraph current from the telephone branch and an inductance coil to exclude the telephone current from the telegraph branch. In the present instance these functions are performed by the condenser 20 and the transformer 1, 2, respectively, and additional security against interference between the telegraph and telephone branches, especially interference with the telephone branch by the telegraph current, is afforded by the particular arrangement of the windings 1, 2, by means of which the effect of the telegraph transmitter currents on the telephone receiver is counteracted.

In Fig. 13, I have shown the application of my invention to an anti-side-tone wireless telephone system. 21 represents an antenna connected to the binding posts P P′ of an arrangement of circuits similar to that shown in Fig. 9 with the exception that the electro-responsive device which it is desired to protect from the currents in the transmitting circuit is an oscillation detector D and with the further exception that the windings 1'', 2'' and the core 3'' are constructed to meet the requirements of high frequency working. 33 is a potentiometer and 34 a telephone receiver connected with the oscillation detector and constituting the usual local circuit. 22 is a condenser which may be employed to tune the circuit which includes the oscillation detector. 8'', 9'' are the windings of a transformer associating the antenna with any suitable source of high frequency current, such for example as the so called "singing-arc" circuit including the arc 24, condenser 25, and primary 8''. 27 is a source of direct current connected with the arc through the resistance or inductance 26 and transmitter 28. It will be understood of course that any suitable source of high frequency current may be employed.

In Fig. 14 the antenna is connected to the binding posts Q Q' of an arrangement of circuits similar to that shown in Fig. 10 with the exceptions above noted in the description of Fig. 13 and of the still further exception that the transformer 10'' 11'' is designed to meet the requirements of high frequency working.

The high frequency current impressed upon the transformer 8'', 9'' in Figs. 13 and 14, will create electrical oscillations in the antenna, but will not affect the detector D or its associated telephone receiver 34 because of the neutralization of the effect on said detector of the transmitting current by the transformer 1'', 2''. In order to regulate the inductive effect between the windings of said transformer I prefer to vary their relative position although the comminuted iron core 3'' above described may be employed.

In Fig. 15 the high frequency oscillations are impressed upon the antenna by the auto-transformer 30, 32. The primary 30 is connected in series with the winding 2'', and the circuit which includes the auxiliary coil 31, inductively associated with the auto-transformer, the condenser 29 and the detector D, is connected in series with the winding 1''. In this case the high frequency transmitting currents are neutralized with respect to the detector D by means of the transformer 1'', 2'' and the auxiliary coil 31 in a manner that will be obvious.

In Fig. 16 I have shown the application of my invention to a system whereby a wireless telephone system may be operated by a wire telephone system and a wire telephone system by a wireless telephone system. In this particular instance I have shown the adaptation of the wire-telephone repeater system illustrated in Fig. 6 to a wire-to-wireless system, W in both cases representing a wire-telephone trunk line and E in Fig. 16 representing a wireless telephone system into which the wire system W may repeat and which in turn may repeat into the wire system W. 4'''''' represents a high frequency source such as the source shown in Fig. 13, connected in series with the transmitter 6''. Telephone pulsations impressed upon the system W at a distant station pass through the winding 1 and actuate the repeater-receiver 5' thereby causing the repeater-transmitter 6'' to vary the high frequency current in accordance with said pulsations and thereby impress upon the antenna through the transformers 8'', 9'' and 10'', 11'' high frequency current similarly modified or varied. The transformer 1'', 2'' protects the detector D in the manner hereinbefore described from the effect of said high frequency current. Electromagnetic waves impinging upon the antenna from a distant transmitting station create oscillations which actuate the detector and the repeater-receiver 5, the latter in turn causes the repeater-transmitter 6' to create pulsations in the current of the battery 4', and these pulsations are sent out over the line W by means of the transformers 8, 9 and 10', 11'. By means of the transformer 1, 2, with its adjustable core 3 the repeater-receiver 5' is protected from the effect of the said battery pulsations sent over the system W.

It will be understood that the particular embodiments of my invention herein specifically described for the purpose of more fully explaining the principle thereof may be subjected to a wide range of variation without departing from said principle. The several means for regulating the inductive effect between the windings of the transformer, although often convenient and in fact essential when my invention is used in lines the conditions of which are not constant, are nevertheless unnecessary when my invention is used in lines the conditions of which are not variable. In such case the transformer coils may be designed with respect to the line to which they are to be connected and no such regulating means will be required.

I claim:

1. In a signaling system, the combination with a circuit including an electro-responsive device and one of the windings of a transformer, of a transmitting circuit associated with said circuit and including the other winding of said transformer, said windings being conductively connected, a signaling device and source of energy associated with said transmitting circuit, and means for regulating the inductive effect between said windings.

2. In a telephone system, a receiving circuit including a receiver and one of the windings of a transformer, a transmitting circuit associated with said receiving circuit and including the other winding of said transformer, said windings being conductively connected, a transmitter and source of energy associated with said transmitting circuit, and means for regulating the inductive effect between said windings.

3. In a telephone system, a receiving circuit including a receiver and one of the windings of a transformer, a transmitting circuit associated with said receiving circuit and including the other winding of said transformer, said windings being conductively connected, a transmitter and source of energy associated with said transmitting circuit, and a core for said windings adjustable with respect thereto.

4. In a telephone system, a receiving circuit including a receiver and one of the windings of a transformer, a transmitting circuit associated with said receiving circuit and including the other winding of said transformer, said windings being conductively connected, a transmitter and source of energy associated with said transmitting circuit, means for regulating the inductive effect between said windings, and a line circuit associated with said receiving and transmitting circuits.

5. In a telephone system, a receiving circuit including a receiver and one of the windings of a transformer, a transmitting circuit associated with said receiving circuit and including the other winding of said transformer, said windings being conductively connected, a transmitter and source of energy associated with said transmitting circuit, means for regulating the inductive effect between said windings, a closed circuit conductively connected with said transmitting and receiving circuits and a line circuit associated with said closed circuit.

6. In a telephone system, a receiving circuit including a receiver and one of the windings of a transformer, a transmitting circuit associated with said receiving circuit and including the other winding of said transformer, the said windings being conductively connected, a transmitter and source of energy associated with said transmitting circuit, means for regulating the inductive effect between said windings, a closed circuit conductively connected with said transmitting and receiving circuits and a line circuit inductively related to said closed circuit.

7. In a telephone system, a receiving circuit including a receiver and one of the windings of a transformer, a transmitting circuit associated with said receiving circuit and including the other winding of said transformer, the said windings being conductively connected, a transmitter and source of energy associated with said transmitting circuit, means for regulating the inductive effect between said windings, a line circuit and means associating said transmitting and receiving circuits serially with said line circuit at a point between the terminal stations.

8. In a telephone system, a receiving circuit including a receiver and one of the windings of a transformer, a transmitting circuit associated with said receiving circuit and including the other winding of said transformer, said windings being conductively connected, a transmitter and source of energy associated with said transmitting circuit, means for regulating the inductive effect between said windings, a line circuit and a transformer having three coils, one coil being conductively connected to said transmitting and receiving circuits and the other two being connected in series with the two sides of the line circuit, respectively.

9. In a signaling system, the combination with a circuit including an electro-responsive device and one of the windings of a transformer, of a transmitting circuit associated with said circuit and including the other winding of said transformer, said windings being conductively connected at both terminals, a signaling device and a source of energy associated with said transmitting circuit.

10. In a telephone system, a receiving circuit including a receiver and one of the windings of a transformer, a transmitting circuit associated with said receiving circuit and including the other winding of said transformer, said windings being conductively connected at both terminals, and a transmitter and source of energy associated with said transmitting circuit.

11. In a telephone system, a receiving circuit including a receiver and one of the windings of a transformer, a transmitting circuit associated with said receiving circuit and including the other winding of said transformer, said windings being conductively connected at both terminals, a transmitter and source of energy associated with said transmitting circuit, and a line circuit associated with said receiving and transmitting circuits.

12. In a telephone system, a receiving circuit including a receiver and one of the windings of a transformer, a transmitting circuit associated with said receiving circuit and including the other winding of said transformer, said windings being conductively connected at both terminals, a transmitter and source of energy associated with said transmitting circuit, a closed circuit conductively connected with said transmitting and receiving circuits and a line circuit associated with said closed circuit.

13. In a telephone system, a receiving circuit including a receiver and one of the windings of a transformer, a transmitting circuit associated with said receiving circuit and including the other winding of said transformer, the said windings being conductively connected at both terminals, a transmitter and source of energy associated with said transmitting circuit, a closed circuit conductively connected with said transmitting and receiving circuits and a line circuit inductively related to said closed circuit.

14. In a telephone system, a receiving circuit including a receiver and one of the windings of a transformer, a transmitting circuit associated with said receiving circuit and including the other winding of said transformer, the said windings being conductively connected at both terminals, a transmitter and source of energy associated with said transmitting circuit, a line circuit and means associating said transmitting and receiving circuits serially with said line circuit at a point between the terminal stations.

15. In a telephone system, a receiving circuit including a receiver and one of the windings of a transformer, a transmitting circuit associated with said receiving circuit and including the other winding of said transformer, said windings being conductively connected at both terminals, a transmitter and source of energy associated with said transmitting circuit, a line circuit and a transformer having three coils, one coil being conductively connected to said transmitting and receiving circuits and the other two being connected in series with the two sides of the line circuit, respectively.

16. A telephone-repeater comprising a receiving circuit including a repeater-receiver and one of the windings of a transformer, a transmitting circuit associated with said receiving circuit and including the other winding of said transformer, said windings being conductively connected, a repeater-transmitter and a source of energy associated with said transmitting circuit, the said repeater-receiver being arranged to actuate the said repeater-transmitter, and means for regulating the inductive effect between said windings.

17. A telephone-repeater comprising a receiving circuit including a repeater-receiver and one of the windings of a transformer, a transmitting circuit associated with said receiving circuit and including the other winding of said transformer, said windings being conductively connected, and a repeater-transmitter and a source of energy associated with said transmitting circuit, the said repeater-receiver being arranged to actuate the said repeater-transmitter.

In testimony whereof, I have hereunto subscribed my name this 15th day of April 1909.

HENRY B. STONE.

Witnesses:
OLIVER KENDALL, Jr.,
JAMES H. GAULT.